US011905771B2

(12) United States Patent
Hussain et al.

(10) Patent No.: US 11,905,771 B2
(45) Date of Patent: Feb. 20, 2024

(54) METHOD AND EQUIPMENT FOR CRUSHING DEBRIS IN DRILLING FLUIDS

(71) Applicant: SAUDI ARABIAN OIL COMPANY, Dhahran (SA)

(72) Inventors: Sajid Hussain, Abqaiq (SA); Syed Muhammad Ali, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/451,908

(22) Filed: Oct. 22, 2021

(65) Prior Publication Data

US 2023/0127681 A1 Apr. 27, 2023

(51) Int. Cl.
*E21B 21/06* (2006.01)
*B02C 1/00* (2006.01)
*B02C 13/28* (2006.01)
*B02C 13/286* (2006.01)

(52) U.S. Cl.
CPC .............. *E21B 21/06* (2013.01); *B02C 1/005* (2013.01); *B02C 13/28* (2013.01); *B02C 13/286* (2013.01); *E21B 21/066* (2013.01); *B02C 2013/28618* (2013.01)

(58) Field of Classification Search
CPC ....... E21B 21/06; E21B 21/066; B02C 1/005; B02C 13/28; B02C 13/286; B02C 2013/28618
See application file for complete search history.

(56) References Cited

U.S. PATENT DOCUMENTS

| | | | | | |
|---|---|---|---|---|---|
| 4,373,592 | A | * | 2/1983 | Dellinger | E21B 21/10 175/325.2 |
| 5,303,786 | A | * | 4/1994 | Prestridge | E21B 21/066 175/207 |
| 5,337,966 | A | * | 8/1994 | Francis | E21B 21/06 241/285.2 |
| 5,400,977 | A | * | 3/1995 | Hayles, Jr. | B02C 13/20 241/46.11 |
| 5,468,291 | A | | 11/1995 | Waterson et al. | |
| 5,651,420 | A | | 7/1997 | Tibbitts et al. | |
| 6,045,070 | A | * | 4/2000 | Davenport | F23G 5/033 241/101.8 |
| 6,230,996 | B1 | | 5/2001 | Angers, Jr. | |
| 6,527,054 | B1 | | 3/2003 | Fincher et al. | |

(Continued)

FOREIGN PATENT DOCUMENTS

| | | | |
|---|---|---|---|
| CA | 2719792 | A1 | 10/2009 |
| CN | 104790892 | A | 7/2015 |

(Continued)

*Primary Examiner* — James G Sayre
(74) *Attorney, Agent, or Firm* — Osha Bergman Watanabe & Burton LLP

(57) ABSTRACT

A crusher includes a housing having an inlet and an outlet at opposite axial sides, an impeller positioned proximate the inlet of the housing, and a shaft connected to the impeller and extending axially through the housing between the inlet and the outlet. At least two spaced apart support structures hold the shaft in the housing, where a plurality of dynamic blades extending outwardly from the shaft are alternatingly positioned between a plurality of fixed blades extending radially inward from an inner wall of the housing.

12 Claims, 6 Drawing Sheets

(56) References Cited

U.S. PATENT DOCUMENTS

| | | | | |
|---|---|---|---|---|
| 8,157,014 | B2 * | 4/2012 | Hariharan | B02C 18/142 241/46.06 |
| 2003/0183393 | A1 * | 10/2003 | Fincher | E21B 21/066 166/265 |
| 2006/0097095 | A1 | 5/2006 | Boast | |
| 2014/0209717 | A1 * | 7/2014 | Barthelmess | E21B 21/066 241/24.1 |
| 2018/0163729 | A1 | 6/2018 | Xiao et al. | |
| 2019/0301253 | A1 | 10/2019 | Mallonee et al. | |

FOREIGN PATENT DOCUMENTS

| | | | |
|---|---|---|---|
| CN | 107626398 | A | 1/2018 |
| CN | 108915615 | A | 11/2018 |
| JP | 2004275840 | A | 10/2004 |
| KR | 101497052 | B1 | 2/2015 |
| KR | 101644328 | B1 | 8/2016 |
| WO | 2014167315 | A2 | 10/2014 |

* cited by examiner

METHOD AND EQUIPMENT FOR CRUSHING DEBRIS IN DRILLING FLUIDS

BACKGROUND

Drilling fluid, also referred to as "drilling mud" or simply "mud," is used to facilitate drilling boreholes into the earth, such as drilling oil and natural gas wells. The main functions of drilling fluids include providing hydrostatic pressure to prevent formation fluids from entering into the borehole, keeping the drill bit cool and clean during drilling, carrying out drill cuttings, and suspending the drill cuttings while drilling is paused and when the drilling assembly is brought in and out of the borehole.

Using one or more mud pumps, drilling fluid may be circulated through a well system. As the drilling fluid is circulated, the drilling fluid may flow from the surface of a well, through a drill string, out the end of the drill string, and back up the well through an annulus formed around the outside of the drill string to return to the surface of the well. In many well systems, a series of different equipment may be positioned along the drilling fluid flow path (e.g., inside the drill string and outside the drill string), which may be used to regulate or monitor the flow of the drilling fluid. For example, measurement-while-drilling (MWD) tools (e.g., tools capable of evaluating physical properties such as pressure, temperature, formation parameters, etc.), drill string float valves, casing float valves, and others may be positioned along the drilling fluid flow path.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a crusher that includes a housing having an inlet and an outlet at opposite axial sides, an impeller positioned proximate the inlet of the housing, a shaft connected to the impeller and extending axially through the housing between the inlet and the outlet, a plurality of dynamic blades extending outwardly from the shaft, a first support structure fixed within the housing proximate the outlet and a second support structure fixed within the housing interior to the impeller, and a plurality of fixed blades provided along an inner wall of the housing and positioned between the first support structure and the second support structure. The dynamic blades may also be positioned between the first support structure and the second support structure. The shaft may extend through a bearing assembly provided in each of the first support structure and the second support structure.

In another aspect, embodiments disclosed herein relate to systems that include at least one pump positioned at a surface of a well, a drill string extending a depth into the well from the surface of the well, piping fluidly connecting the at least one pump to the drill string, and a crusher positioned along the piping. The crusher may include a housing having an inlet and an outlet at opposite axial sides, an impeller positioned proximate the inlet of the housing, a shaft connected to the impeller and extending axially through the housing between the inlet and the outlet, at least two spaced apart support structures holding the shaft in the housing, a plurality of dynamic blades extending outwardly from the shaft, and a plurality of fixed blades extending radially inward from an inner wall of the housing and alternatingly positioned between the dynamic blades.

In yet another aspect, embodiments disclosed herein relate to methods that include providing a crusher along a flow path extending from a mud pump to a standpipe in a well system. The crusher may include a housing, a plurality of alternating fixed blades and dynamic blades positioned between an inlet and an outlet to the housing, wherein the dynamic blades extend outwardly from a shaft extending through the crusher, and wherein the fixed blades extend inwardly from an inner wall of the housing, and an impeller connected to the shaft and positioned at an inlet side of the plurality of alternating fixed and dynamic blades. Methods may also include pumping a drilling fluid from the mud pump through the crusher, wherein drilling fluid flow around the impeller rotates the impeller, the connected shaft, and the dynamic blades.

Other aspects and advantages will be apparent from the following description and the appended claims.

BRIEF DESCRIPTION OF DRAWINGS

Wherever possible, like or identical reference numerals are used in the figures to identify common or the same elements. The figures are not necessarily to scale and certain features and certain views of the figures may be shown exaggerated in scale for purposes of clarification.

DETAILED DESCRIPTION

Embodiments of the present disclosure are described below in detail with reference to the accompanying figures. In the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Embodiments of the present disclosure relate generally to methods and equipment for crushing debris in fluid prior to circulating the fluid downhole. Such methods and equipment may be used to prevent plugging of downhole equipment in a well system (e.g., drill strings and casing), which may otherwise occur when larger or uncrushed debris in fluid (e.g., drilling fluid) is circulated through the well system.

Figure 1:
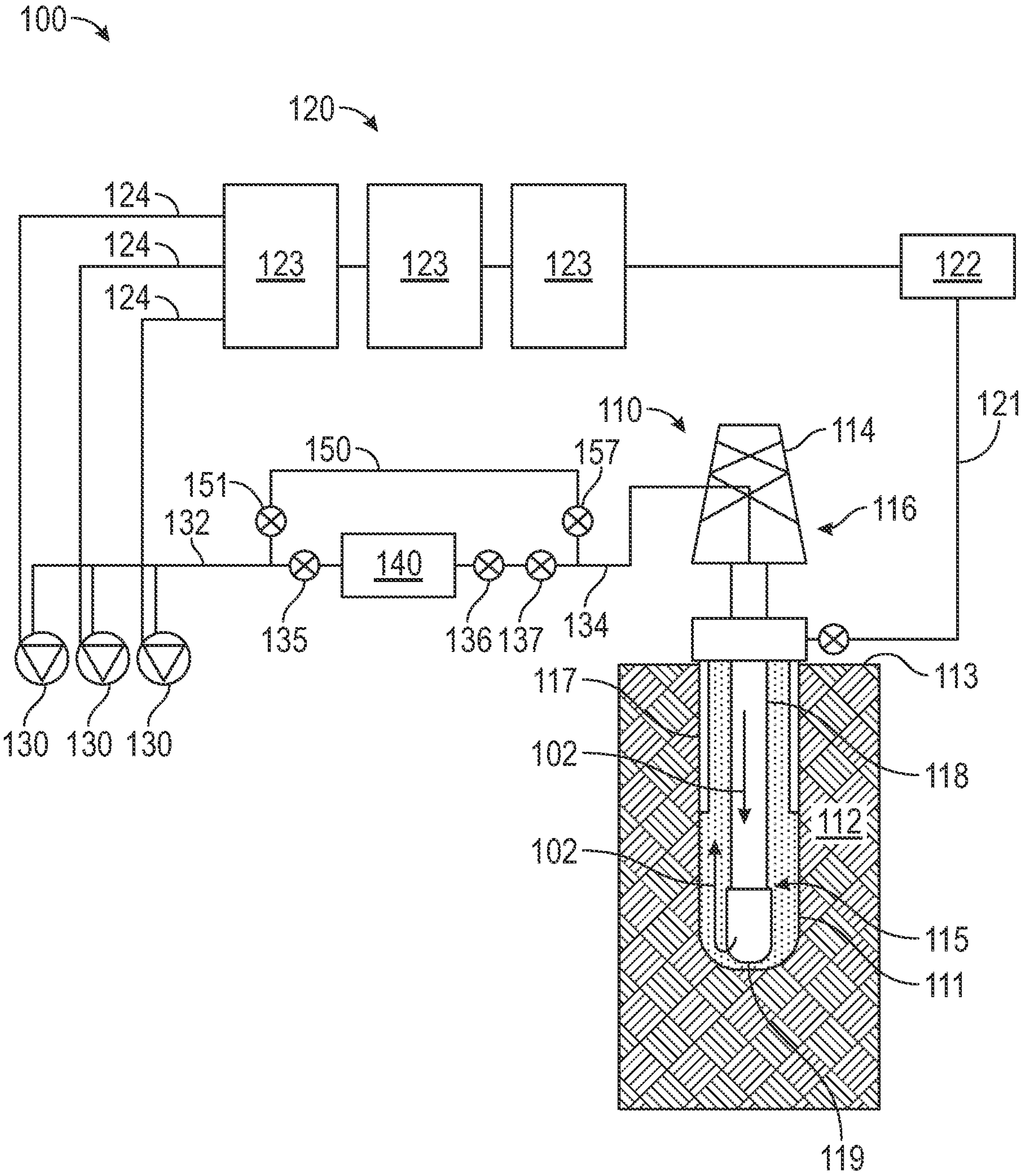
FIG. 1 shows a system according to embodiments of the present disclosure.

FIG. 1 shows a schematic diagram of a system 100 in which the methods and equipment disclosed herein may be used in accordance with one or more embodiments of the present disclosure. In one or more embodiments, one or more of the modules and/or elements shown in FIG. 1 may be omitted, repeated, and/or substituted. As shown in FIG. 1, the system 100 may include a well system 110, a mud return system 120, one or more pumps 130, and a crusher 140, which may be directly and indirectly in communication with each other.

The well system 110 may include a well 111 being drilled through a formation ("formation") 112 beneath the earth's surface ("surface") 113, either from the sea floor (for offshore drilling) or from land (for onshore drilling). The well 111 may include a borehole that extends from the surface 113 into the formation 112. As the well 111 is drilled through the formation 112, portions of the well may be cased with a casing 117 (extending from the surface of the well) or a liner (extending downhole from an end of a previously installed casing or liner) to line the well wall. The terms "open hole," "borehole," and "wellbore" may be used interchangeably and refer to an uncased portion of a well 111. An upper end of the well 111, terminating at or near the surface 113, may be referred to as the "up-hole" end of the well 111, and a lower end of the well, terminating in the formation 112, may be referred to as the "downhole" end of the well 111.

The well system 110 may include a well surface system 116 positioned above an opening to the well 111, a well sub-surface system 115, and a well control system (not shown) that may control various operations of the well system 110, such as well production operations, well drilling operations, well completion operations, well maintenance operations, and reservoir monitoring, assessment and development operations.

In some embodiments, the well surface system 116 may include a rig 114, which may hold the equipment used to drill a borehole to form the well 111. Major components of the rig 114 may include a derrick or mast, drawworks, a rotary table or top drive, drill string pipe that has not yet been extended into the well 111, power generation equipment and auxiliary equipment, one or more standpipe (a pipe that provides a high-pressure pathway for drilling fluid 102 to travel partially up the derrick), and a flexible high-pressure hose (e.g., a rotary hose) that may direct the drilling fluid 102 from the standpipe to the drill string. The well surface system 116 may also include a wellhead installed at or near where the well terminates at the surface 113, where the wellhead may include a rigid structure for supporting (or "hanging") casing 117 extending into the well 111.

In cases of offshore drilling, rig equipment may be provided on a platform located at the surface of the water (e.g., either floating on the surface of the water or fixed to the sea floor), where the well system may further include a riser system connecting the platform to a wellhead located at the sea floor. Drill string and other conduits (e.g., umbilicals and cables) may extend along the riser system from the platform to the sea floor for conducting a drilling operation.

The well sub-surface system 115 may include a system of equipment provided downhole, in the well, that may be used for well operations. For example, the well sub-surface system 115 may include casing 117, a drill string 118 extending a depth into the well 111 from the surface of the well, and a bottom hole assembly 119 (including a drill bit) positioned at an end of the drill string 118.

Fluids may be circulated through the well 111 and well sub-surface system 115 during well operations, including, for example, the flow of hydrocarbon production (e.g., oil and gas) from a reservoir to the surface 113 during production operations, the injection of substances (e.g., water) into the formation or reservoir during injection operations, or the communication of monitoring devices (e.g., logging tools) lowered into the well during monitoring operations (e.g., during in situ logging operations). In a drilling operation, drilling fluid 102 may be pumped from equipment in the well surface system 116 located at the surface of the well (or on a platform for offshore drilling) to flow downhole through the drill string 118 and be circulated through the well sub-surface system 115. When the drilling fluid 102 exits the end of the drill string 118, the drilling fluid 102 may flow back up the well through an annulus formed around the outside of the drill string 118 (e.g., through an annulus formed between the casing 117 and the drill string 118) to return to the surface of the well. As the drilling fluid 102 is returned through the well annulus from the end of the drill string 118, the returning drilling fluid 102 may pick up cuttings from the formation and other debris.

When the returning drilling fluid 102 reaches the up-hole end of the well, the returning drilling fluid 102 may exit the well and be directed through certain equipment in the well surface system 116, e.g., the wellhead, one or more manifolds, and pump(s). In some embodiments, the well surface system 116 may include flow regulating devices (e.g., valves, chokes) that are operable to control the flow of substances into and out of the well 111.

Returning drilling fluid 102 (which may carry cuttings and/or other debris from downhole) may be directed from the well surface system 116 to a mud return system 120 via one or more mud return conduits 121 (e.g., piping). A mud return system 120 may include one or more separators 122 (sometimes referred to in the industry as shakers). A separator 122 may include, for example, one or more screens arranged in the flow path of the returned drilling fluid to catch and separate cuttings from the drilling fluid. For example, a separator 122 may have a screen positioned laterally at an upper end of the separator 122, where returned drilling fluid may be flowed over the screen after returning from the well 111. As the returned drilling fluid is flowed over the screen, cuttings in the returned drilling fluid may be caught by the screen, while the drilling fluid flows through the screen openings. In such manner, cuttings brought up from drilling the well 111 may be captured and held by a screen in a separator 122. In some embodiments, more than one screen and/or more than one separator may be used to separate cuttings from returned drilling fluid. The amount of cutting and/or other debris that is filtered out of returned drilling fluid from a separator 122 may depend, for example, on the size of the holes in the separator screen(s) and the size of the cuttings/debris being carried by the returned drilling fluid.

The mud return system 120 may further include one or more mud tanks (or pits) 123, which may be used to collect filtered and/or unfiltered returned drilling fluid. By collecting returned drilling fluid in a mud collection receptacle such as a mud tank 123, the returned drilling fluid may be circulated back through the well system 110 and reused for well operations. For example, one or more mud lines 124 may fluidly connect the mud tanks 123 to mud pumps 130, which may pump the collected drilling fluid from the mud tanks 123 back to the well system 110. In some embodiments, drilling fluid may be provided from a different drilling fluid source, such as mud trucks, in addition to or alternatively to providing drilling fluid from mud tank(s) 123.

The system 100 may further include piping 132, 134 fluidly connecting the mud pump(s) 130 to the well system 110, such that drilling fluid may be pumped from the mud pump(s) 130 to the drill string 118. Piping 132 may include mud discharge lines that carry drilling fluid being discharged from the mud pumps 130 and pumped to the crusher 140. In such manner, drilling fluid may be suctioned by the mud pumps 130 via mud lines 124 and discharged via piping 132. A crusher 140 according to embodiments of the present disclosure may be positioned along the piping 132, 134, wherein an upstream portion of the piping 132 fluidly connects the mud pump(s) 130 to an inlet of the crusher 140, and a downstream portion of the piping 134 extends from an outlet of the crusher 140 to the well system 110.

A bypass line 150 may be fluidly connected to the pipping 132, 134, which may direct fluid from the mud pump(s) 130 to the well system 110 without going through the crusher 140. The bypass line 150 may be fluidly connected at an inlet connection to the upstream portion of the piping 132, upstream of the inlet to the crusher 140, via a bypass valve 151. The bypass line 150 may also be fluidly connected to the downstream portion of the piping 134 at an outlet connection, downstream of the outlet. Additionally, an inlet valve 135 may be positioned along the upstream portion of the piping 132 between the inlet to the crusher 140 and the inlet connection to the bypass line 150, and an outlet valve 136 may be positioned along the downstream portion of the piping 134 between the outlet to the crusher 140 and the outlet connection to the bypass line 150. When fluid is being directed through the bypass line 150 to bypass the crusher 140, the inlet and outlet valves 135, 136 may be closed and the bypass valve 151 may be opened.

According to embodiments of the present disclosure, one or more non-return valves 137, 157 (e.g., check valves or other one-way valves) may be used to prevent fluid from backflowing into the crusher 140. For example, a first non-return valve may be positioned downstream from the outlet to the crusher 140, e.g., along the downstream portion of the piping 134 between the outlet valve 136 and the outlet connection to the bypass line 150. In some embodiments, a second non-return valve 157 may be positioned along the bypass line 150 between the bypass valve 151 and the outlet connection between the bypass line 150 and downstream portion of the piping 134.

When operating in the system 100, a drilling fluid may be circulated from the well system 110, to the mud return system 120, to the mud pump(s) 130, and back to the well system 110, where the drilling fluid may pass through the crusher 140 between the mud pump(s) 130 and the well system 110 or may bypass the crusher 140 via the bypass line 150. For example, drilling fluid returned from downhole in the well system 110 may be collected in at least one mud tank 123, the collected drilling fluid may be pumped from the mud tank(s) 123 to the crusher 140, where the crusher 140 may crush debris in the drilling fluid, and then the drilling fluid may be pumped from the crusher 140 back to the well system 110.

By crushing debris in drilling fluid through the crusher 140 prior to pumping the drilling fluid 102 downhole, the likelihood of clogs forming along drilling fluid flow paths in the well system 110 may be reduced. For example, various well system equipment that are used to direct and control drilling fluid as it is circulated downhole may have differences in flow path size and shape, such as changes in flow path size or shape through chokes and valves, which may catch debris as it flows therethrough. Examples of different well system equipment that conventionally have issues with debris plugging include, but are not limited to, measurement-while-drilling (MWD) tools, non-return float valves used in drill strings to prevent fluid flowback, plunger valves along the drill string, and casing equipment valves. Additionally, in some instances, debris may damage internal flow paths in fluid conduits such as a rotary hose. By sufficiently crushing any debris present in drilling fluid with the crusher 140, the smaller-sized, crushed debris may more easily pass through the well system equipment with less potential damage to the well system equipment, thereby reducing the likelihood of damage and debris plugging the well system equipment. When plugs in the well system equipment are prevented, sufficient drilling fluid circulation through the well may be maintained, and costly fishing operations to retrieve plugged equipment may be prevented, thereby reducing non-productive time in the well operation.

According to embodiments of the present disclosure, a crusher may include a housing having an inlet and an outlet at opposite axial sides and a flow path extending therebetween, where the inlet may be fluidly connected to at least one pump, and the outlet may be fluidly connected to a well system (e.g., fluidly connected to a standpipe, which may be fluidly connected to a drill string via a rotary hose). A plurality of dynamic blades rotatable via a shaft and a connected impeller may be provided inside the crusher housing. When fluid is pumped from the pump through the crusher, the flow of fluid through the crusher flow path may rotate the impeller, where rotation of the impeller rotates the shaft and the connected dynamic blades. Rotation of the dynamic blades as fluid flows therethrough may crush debris in the fluid within the spaces formed between the dynamic blades and the crusher housing and/or formed between the dynamic blades and a plurality of fixed blades provided along the interior of the crusher housing.

Figure 2:
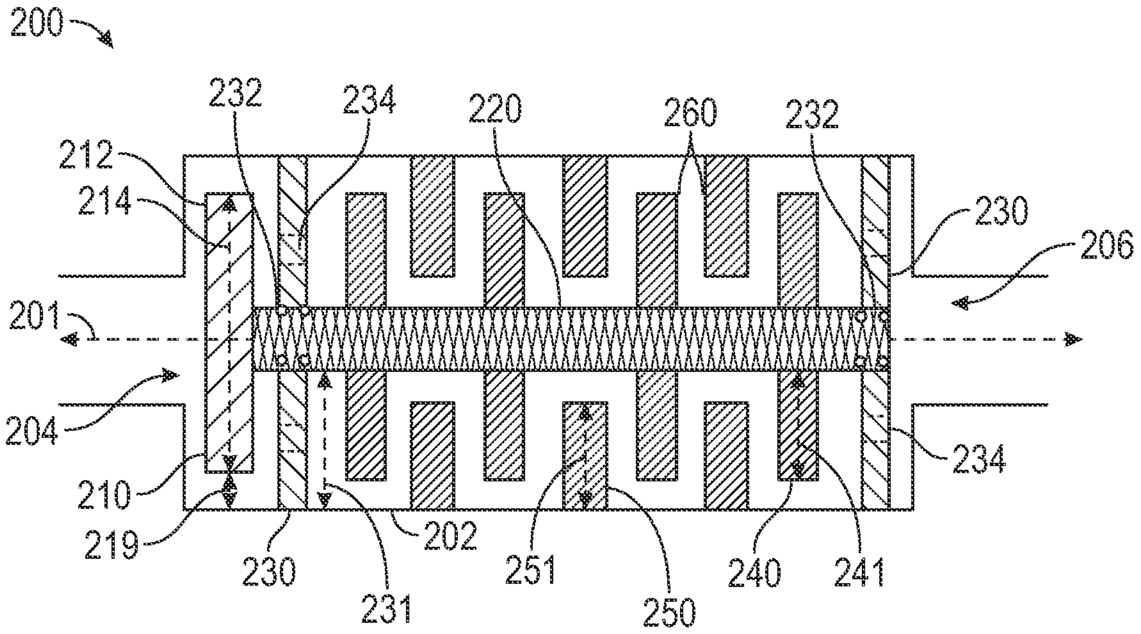
FIG. 2 shows a cross-sectional view of a crusher according to embodiments of the present disclosure.

FIG. 2 shows an example of a crusher 200 according to embodiments of the present disclosure in a cross-sectional view along its central longitudinal axis 201. The crusher 200 includes a housing 202 having an inlet 204 and an outlet 206 at opposite axial sides of the housing 202. An impeller 210 may be positioned proximate the inlet 204 of the housing 202, e.g., in the inlet 204 opening or interior to the inlet 204. The impeller 210 may be held in the housing 202 via a connected shaft 220, where the impeller 210 and connected shaft 220 may be capable of rotating about a rotational axis. The shaft 220 may be coaxially connected to the impeller 210 and extend axially through the housing 202 between the inlet 204 and the outlet 206. Additionally, the impeller 210 and connected shaft 220 may be coaxial with the interior volume defined by the housing 202. For example, the rotational axis of the impeller 210 and shaft 220 may be coaxial with the longitudinal axis 201 of the housing 202.

An impeller 210 may include a plurality of pitched blades 212 extending in a radially outward direction from the impeller rotational axis. The impeller 210 may be positioned in the housing 202, along the flow path through the crusher, such that the pitched blades interface with fluid flowing through the inlet 204 to the housing 202. Additionally, the impeller 210 may have a diameter 214 that is less than an inner diameter of the housing 202, such that the impeller 210 may rotate within the housing 202. Depending on the design of the pitched blades 212 and the size of the impeller 210, fluid flowing through the inlet 204 of the housing 202 may flow through the pitched blades 212 or around the pitched blades 212 between a gap formed between the impeller outer diameter and the housing inner wall.

Figure 3:
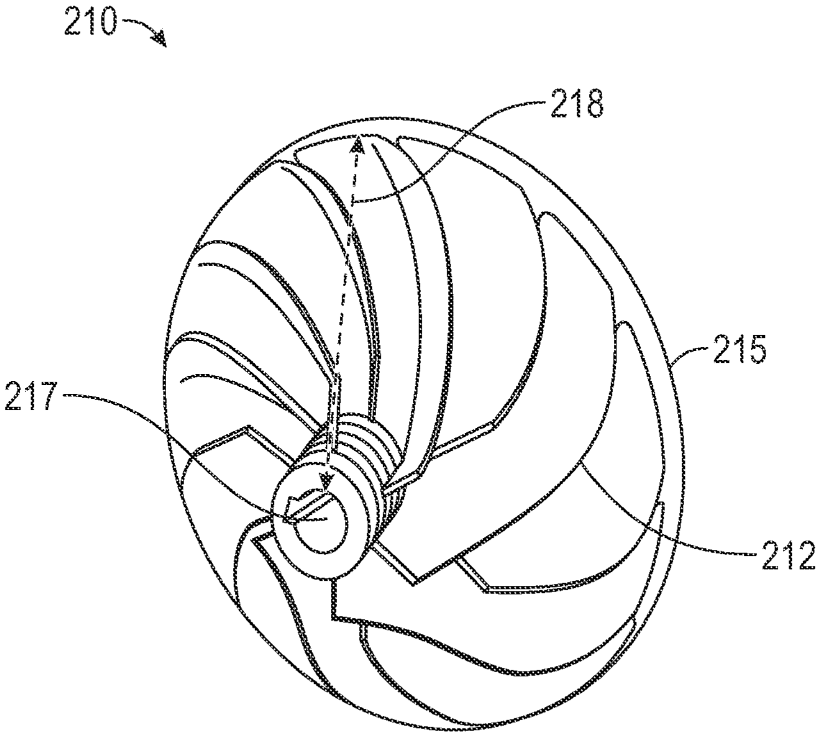
FIG. 3 shows a perspective view of an impeller used in a crusher according to embodiments of the present disclosure.

For example, FIG. 3 shows an example of an impeller 210 having a plurality of pitched blades 212, which may be mounted on and extend a height from an impeller base plate 215. The height of the pitched blades 212 may vary along the radius of the impeller 210. The pitch (or rotational curve) of the pitched blades 212 may be designed to effectuate rotation of the impeller 200 as fluid pushes on the pitched blades 212.

The base plate 215 may have a central hole 217 formed therethrough along the rotational axis of the impeller 210, where the shaft 220 may be connected through the central hole (e.g., by welding or using interlocking features such as tongues and grooves formed on the outer surface of the shaft 220 and inner surface of the hole to rotationally lock the shaft 220 to the hole). In some embodiments, a shaft 220 may be integrally formed with the base plate 215, extending a length from and coaxial with the impeller 210. The pitched blades 212 may extend radially outward from the rotational axis of the impeller 210 along the base plate 215.

The impeller 210 may extend a radial distance 218 from a connected shaft (or from the central hole 217 receiving the shaft 220) to a radially outermost point of the impeller 210 (which may be a point on the pitched blades 212 or a point on the base plate 215). The radial distance 218 of the impeller 210 may be less than a housing radius measured between the shaft 220 and an inner wall of the housing 202, such that a gap 219 is formed between the impeller 210 and the inner wall of the housing 202 when the impeller 210 and shaft 220 are installed in the housing 202. Such gap 219 may form part of a flow path for fluid flowing through the crusher 200.

In some embodiments, an impeller may have a plurality of pitched blades extending in a radial direction from the shaft, where flow paths may be formed between the pitched blades. For example, an impeller having a plurality of pitched blades and no base plate may be used in a crusher according to embodiments of the present disclosure, where fluid may flow through the impeller between the pitched blades.

Referring again to FIG. 2, an impeller 210 and a connected shaft 220 may be held within the housing 202 of a crusher 200 using at least two spaced apart support structures 230 connected to (e.g., welded to or integrally formed with) an inner wall of the housing 202. The support structures 230 may each extend a radial distance 231 from the inner wall of the housing to the shaft 220. Additionally, the support structures 230 may rotationally hold the shaft 220 via a bearing assembly 232 provided between the support structures 230 and the shaft 220. As shown in FIG. 2, the spaced apart support structures 230 may include a first support structure fixed within the housing interior to the impeller 210 and a second support structure fixed within the housing proximate the outlet 206. In other embodiments, support structures 230 may be positioned in other spaced apart locations along the length of the shaft 220 to hold the shaft 220 centrally in the interior space defined by the housing 202.

The support structures 230 may have a plurality of flow paths 234 formed therethrough, such that fluid flowing through the crusher 200 may pass through the support structures 230 as the fluid moves between the inlet 204 and outlet 206 of the housing 202. For example, in some embodiments, the support structures may include two or more bars extending along a single plane from an inner wall of the housing to the shaft, where the bars may be equally spaced around a circumference of the shaft. The space between the bars may provide flow paths for fluid to flow through the support structures as fluid is pumped through the crusher. Such support structure configurations may include a wagon wheel shape, where flow paths may be formed through the spokes of the support structure.

Figure 4:
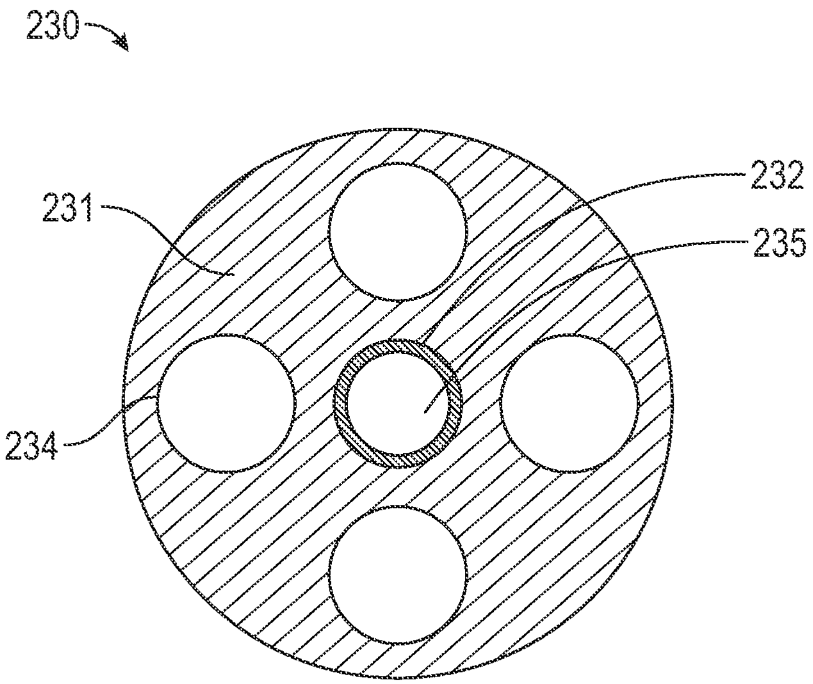
FIG. 4 shows a support structure used in a crusher according to embodiments of the present disclosure.

FIG. 4 shows another example of a support structure 230 according to embodiments of the present disclosure. The support structure 230 may be a plate 231 having a plurality of flow paths 234 provided by holes formed the thickness of the plate 231. The plate 231 may also have a central hole 235 through which the shaft 220 may extend. A bearing assembly 232 may be provided around the perimeter of the central hole 235. When the shaft 220 is inserted through the central hole 235, the shaft 220 may interface with and rotate within the bearing assembly 232. The bearing assembly 232 may aid in the shaft 220 being able to rotate within the central hole 235, for example, by providing a reduced friction surface between the shaft 220 and the plate 231. A bearing assembly 232 may include, for example, ball bearings held within a track, a bearing surface (e.g., made of diamond, metal, and ceramic materials), or other bearing types.

The number and size of flow path holes 234 formed around the plate 231 may be designed to keep the pressure drop of the fluid flowing between the inlet and outlet of the crusher within a selected range. For example, the number and size of the flow path holes 234 formed through the plate 231 may be selected, in combination with other crusher design parameters, to maintain the pressure drop of fluid flowing through the crusher to below 500 psi. Additionally, the number and size of flow path holes 234 may be selected to maintain a sufficient amount of structural integrity in the support structure 230 to withstand vibrations and other forces encountered during operation of the crusher 200. In the embodiment shown in FIG. 4, the flow path holes 234 may be circumferentially and axisymmetrically spaced around the central hole 235 and bearing assembly 232. However, other patterns of flow path holes may be used.

The plate 231 may have a diameter equal to an inner diameter of the housing 202, such that when the plate 231 is installed within the housing 202, the plate 231 may extend radially inward from the inner wall of the housing 202 to the shaft 220.

Referring again to FIG. 2, a crusher 200 may also include a plurality of dynamic blades 240 extending outwardly from the shaft 220 and a plurality of fixed blades 250 provided along an inner wall of the housing 202. The dynamic blades 240 and the fixed blades 250 may be alternatingly positioned along the length of the crusher 200 with spaces formed around and between the blades that are large enough to allow fluid to flow through the crusher 200 and small enough to crush debris (e.g., cuttings, metallic pieces, and plastic pieces) between the blades. Additionally, the dynamic blades 240 and fixed blades 250 may be positioned between the shaft support structures 230, such as shown in FIG. 2, or the dynamic and fixed blades 240, 250 may be positioned around both sides of at least one support structure.

The dynamic blades 240 may be integrally formed with the shaft 220, or the dynamic blades 240 may be attached (e.g., welded) to the shaft 220, such that the dynamic blades 240 may rotate with the shaft 220 as the shaft 220 is rotated. The dynamic blades 240 may extend radially outward from the shaft 220 a first distance 241 that is less than a housing radius measured in a radial direction from the shaft 220 to an inner wall of the housing 202. In such manner, a dynamic blade gap may be formed between the outermost perimeter of each of the dynamic blades and the inner wall of the housing 202. The dynamic blade gaps may form part of the flow path through the crusher 200, where fluid flowing through the crusher 200 may flow around the dynamic blades through the dynamic blade gaps.

The fixed blades 250 may be integrally formed with the inner wall of the housing 202, or the fixed blades 250 may be attached (e.g., welded) to the inner wall of the housing 202. The fixed blades 250 may extend radially inward from the housing inner wall a second distance 251 that is less than the housing radius (measured in a radial direction between the shaft 220 to the inner wall of the housing 202). In such manner, a fixed blade gap may be formed between the inner perimeter of each of the fixed blades and the shaft 220. The fixed blade gaps may form part of the flow path through the crusher 200, where fluid flowing through the crusher 200 may flow around the fixed blades through the fixed blade gaps.

Additionally, the dynamic and fixed blades 240, 250 may have a clearance 260 formed between the lateral sides of adjacent blades. The clearance 260 may be large enough to allow fluid to flow therethrough, but small enough that debris flowing with the fluid gets crushed between adjacent blades. For example, a mud system may have an average particle size distribution of about 1000 microns and a wide range of mud additive particles (e.g., lost circulation material particles) ranging in size from about 5 microns up to about 1000 microns, where the crusher may be designed to crush any debris larger than the mud system particles (e.g., larger than 1000 microns) into small pieces.

The dynamic blade gaps, the fixed blade gaps, and the clearance 260 between adjacent blades may be optimized (along with other crusher design parameters) to provide a minimal pressure drop through the crusher 200. A pressure drop in fluid flowing through the crusher 200 between the inlet and the outlet of the housing may depend on, for example, the flow rate of the fluid flowing through the crusher 200, the fluid density, the fluid temperature, the total flow area through the crusher, and others. For example, a total flow path area calculated as the sum of the dynamic blade gaps, the fixed blade gaps, and the clearance between adjacent blades may be optimized for a selected desired pressure drop. In some embodiments, a total flow path area within a crusher housing may be designed such that a pressure drop in drilling fluid flow between the inlet and the outlet of the housing may be within a 500 psi limit.

Dynamic and fixed blades 240, 250 may have various shapes and sizes, such that when the dynamic blades 240 rotate relative to the fixed blades 250, debris may be crushed between the dynamic and fixed blades 240, 250. For example, dynamic and fixed blades 240, 250 may have ridged, rough, burred, or otherwise textured lateral surfaces, which when rotated relative to each other and positioned with a small enough clearance 260 therebetween, debris may be grinded between the textured lateral surfaces.

Figure 5:
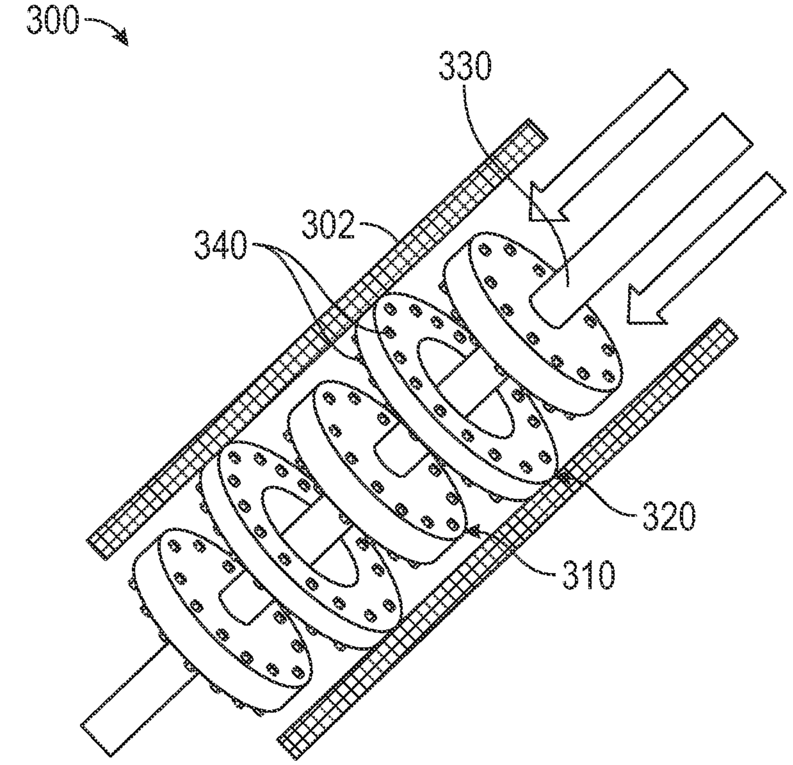
FIG. 5 shows a partially assembled crusher according to embodiments of the present disclosure.

FIG. 5 shows an example blade configuration according to embodiments of the present disclosure in a partially assembled crusher 300. A plurality of alternatingly positioned dynamic blades 310 and fixed blades 320 may be assembled in a crusher housing 302. The dynamic blades 310 may be attached to or integrally formed with a shaft 330, and the fixed blades 320 may be attached to or integrally formed with the housing inner wall. Additionally, the dynamic and fixed blades 310, 320 may have disc shapes, where the dynamic blades 310 may extend outwardly from the shaft 330 around the entire circumference of the shaft 330, and the fixed blades may extend inwardly from the housing inner wall around the entire inner circumference of the housing inner wall.

Each of the dynamic blades 310 and the fixed blades 320 may have a plurality of burrs 340 formed on the opposite lateral sides of the disc-shaped blades 310, 320. Burrs may be formed on the lateral sides of the blades 310, 320, for example, by machining operations, such as grinding, drilling, milling, engraving or turning to form a network of raised edges or points. The burred lateral sides of the dynamic blades 310 may face the burred lateral sides of the fixed blades 320 and have a clearance therebetween, such that when debris is flowed between the dynamic and fixed blades 310, 320, the burred lateral sides of the blades may crush the debris.

Figure 6A:
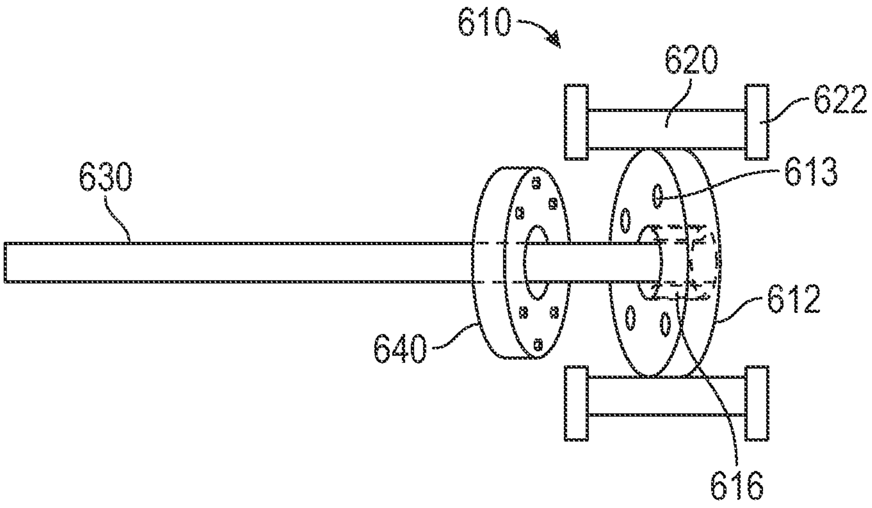
FIGS. 6A-C show steps for forming a crusher according to embodiments of the present disclosure.
Figure 6B:
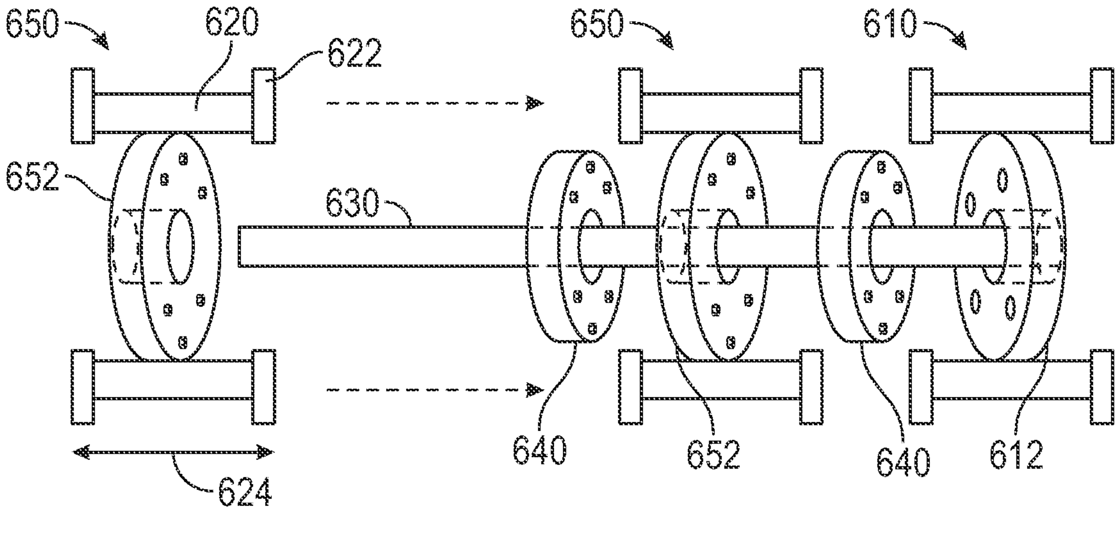
Figure 6C:
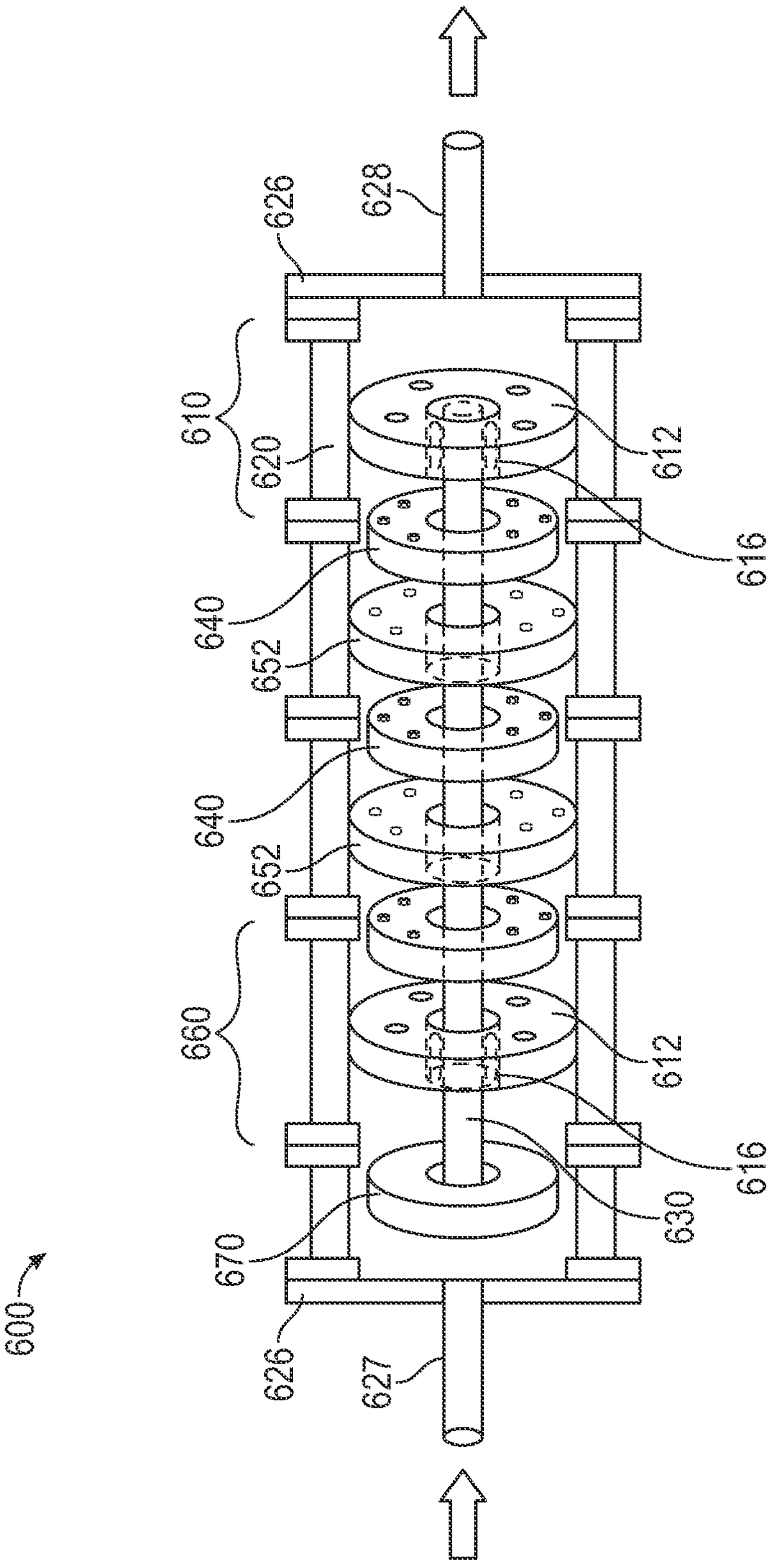

FIGS. 6A-6C show an example of a method for assembling a crusher 600 according to embodiments of the present disclosure. As shown in the step in FIG. 6A, a first end unit 610 may be assembled, which may include a support structure 612 fixed within a housing section 620. The support structure 620 may be a plate having a plurality of holes 613 formed through its thickness. In the embodiment shown, the housing section 620 is shown in cross-sectional view to show the components held therein; however, the housing section 620 may extend around the entire circumference of the support structure 612. Additionally, the housing section 620 may have a flange connection 622 at one or both axial ends of the housing section 620. A first end of a shaft 630 may be inserted into a central hole in the support structure 612, where a bearing assembly 616 may be provided between the support structure 612 and the shaft 630 to allow rotation of the shaft 630 within the support structure 612.

A dynamic blade 640 may then be slid around the shaft 630 (in a direction from left to right in the embodiment shown) to be positioned next to the support structure 612 in the first end unit 610. The dynamic blade 640 may be locked into place around the shaft 630 using a key lock feature, for example.

As shown in the step in FIG. 6B, after the dynamic blade 640 is installed around the shaft 630, a fixed blade unit 650 may be installed on the shaft 630 on a side of the dynamic blade 640 opposite from the first end unit 610. Similar to the first end unit 610, a fixed blade unit 650 may include a fixed blade 652 fixed within a housing section 620, where the housing section may have flange connection(s) 622 the axial ends of the housing section 620. The fixed blade unit 650 may be slid around the shaft 630 (in a direction from left to right in the embodiment shown) to be positioned next to the dynamic blade 640 on the side of the dynamic blade 640 opposite the first end unit 610. The housing sections 620 in the first end unit 610 and the fixed blade unit 650 may have a width 624 greater than the thicknesses of the fixed blade 652 and the support structure 612, such that when the end unit 610, dynamic blade 640, and fixed blade unit 650 are assembled together around the shaft 630, the housing sections 620 may contact each other and be connected together in an end-to-end fashion (e.g., through flange connections 622).

Additional dynamic blades 640 and fixed blade units 650 may be alternatingly assembled around the shaft 630 until a desired size of the crusher 600 is reached. As the alternating fixed blade units 650 are installed, the housing sections 620 may be connected together, where adjacent and connected together housing sections 620 may enclose the alternatingly positioned dynamic blades 640.

As shown in FIG. 6C, once a selected number of dynamic blades 640 and fixed blade units 650 are alternatingly assembled around the shaft 630, a second end unit 660 may be slid around the shaft 630, at an opposite end of the shaft 630 from the first end unit 610. Similar to the first end unit 610, the second end unit 660 may include a support structure 612 fixed within a housing section 620. A bearing assembly 616 may be provided between the support structure 612 and the shaft 630 to allow rotation of the shaft 630 within the second end unit 660. The housing section 620 of the second end unit 660 may be connected to an adjacent housing section 620 of a fixed blade unit 650. After the second end unit 660 is assembled, an impeller 670 may be installed on and fixed to the shaft 630, such that rotation of the impeller 670 rotates the shaft 630. In some embodiments, a housing section 620 may be connected to the second end unit housing section 620 to encircle the impeller 670.

After the impeller 670 is installed, housing end caps 626 may be connected to the axial ends of the connected together housing sections 620. The end cap 626 connected at the axial end of the assembly proximate the first end unit 610 may have an outlet 628 formed therein, and the end cap 626 connected at the axial end of the assembly proximate the impeller 670 may have an inlet 627 formed therein. In such manner, fluid may enter the crusher 600 through the inlet 627, flow through the impeller 670 to rotate the shaft 630 and connected dynamic blades 640, and exit the crusher 600 at the outlet 628. Debris in the fluid may be crushed between the dynamic blades 640 and fixed blades 652 as the fluid flows through the crusher 600.

Crushers according to embodiments disclosed herein may be used crush debris in a drilling fluid after the drilling fluid has been pumped from a drilling fluid source (e.g., a mud pit or mud tank) but before the drilling fluid enters a drill string in a well operation. By using crushers according to embodiments disclosed herein, the size of debris flowing with drilling fluid into a well operation may be reduced, which may reduce the likelihood of the debris plugging downhole equipment.

Figure 7:
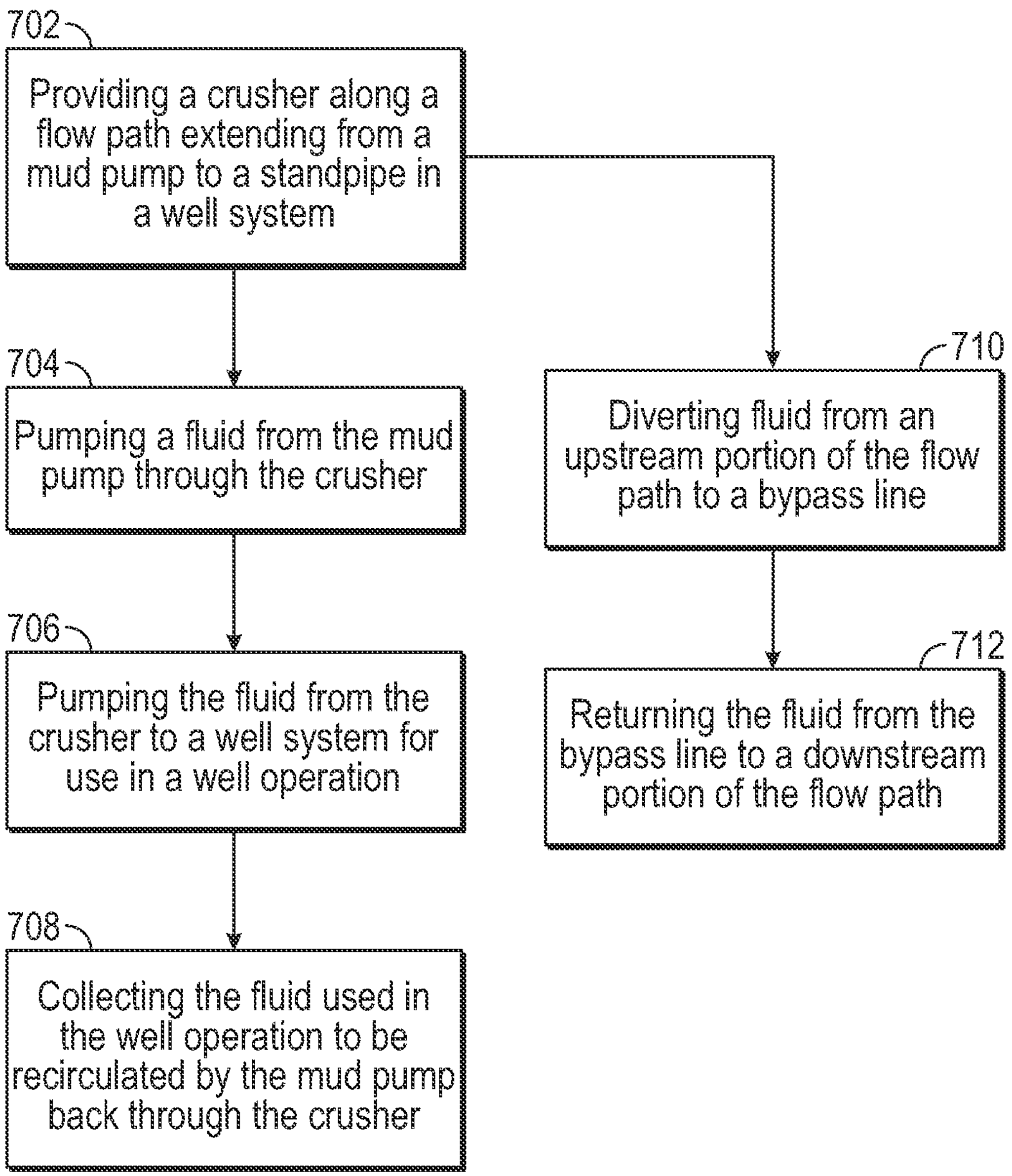
FIG. 7 shows a method according to embodiments of the present disclosure.

FIG. 7 shows an example of a method 700 utilizing a crusher according to embodiments of the present disclosure. In one or more embodiments, one or more of the modules and/or elements shown in FIG. 7 may be omitted, repeated, and/or substituted. The method 700 may include, at step 702, providing a crusher according to embodiments disclosed herein along a flow path extending from a mud pump to a standpipe (or other surface equipment) in a well system. As described above, a crusher may include, for example, a housing, a plurality of alternating fixed blades and dynamic blades positioned between an inlet and an outlet to the housing, and an impeller connected to the shaft and positioned at an inlet side of the plurality of alternating fixed and dynamic blades.

At step 704, a fluid (e.g., a drilling fluid or injection fluid) may be pumped from the mud pump through the crusher. As the fluid flows through the crusher, the fluid may apply force on and thereby rotate the impeller as the fluid flows around the impeller. As the flowing fluid rotates the impeller, the connected shaft and dynamic blades may also rotate. In such manner, the fluid pumped from the mud pump may hydraulically drive and power the crusher. Additionally, as the fluid is flowed through the crusher, the hydraulically driven rotating dynamic blades may crush debris in the fluid against the fixed blades provided in the crusher.

The flow rate of a fluid being pumped through the crusher may be same at the inlet and outlet of the crusher. There may also be an associated pressure drop as the fluid passes thru the crusher, and accordingly, the mud pump(s) may pump at a higher pressure compared to the pumping pressure used when the crusher is not installed or when the fluid is bypassed around the crusher.

When the fluid, including any crushed debris, exits the crusher, the fluid may then be sent to the well system for use in a well operation (e.g., a drilling operation) in step 706. For example, a drilling fluid may be pumped from the outlet of the crusher to a standpipe in the well system, where the drilling fluid may then be directed from the standpipe into a connected drill string (e.g., connected through a rotary hose). By installing a crusher after (downstream of) the mud pumps, debris in the drilling fluid being pumped by the mud pumps may be crushed right before the drilling fluid goes to the standpipe manifold.

After using the fluid in a well operation, the fluid may be collected, in step 708, where the collected fluid may later be recirculated by the mud pump back through the crusher. For example, drilling fluid returned from downhole in a well system may be collected in at least one mud tank, where the collected drilling fluid may be pumped from the mud tank(s) to the crusher to be reused in a drilling operation.

In some embodiments, an installed crusher may need maintenance, or a process may include bypassing a fluid around the crusher. Accordingly, the method 700 may include diverting fluid flowing along an upstream portion of the flow path extending from a mud pump to the crusher to a bypass line (e.g., by opening and closing one or more valves along the flow path and bypass line), as shown in step 710. For example, an inlet valve to the crusher may be closed and a bypass valve may be opened to direct fluid from the upstream portion of the flow path to the bypass line. In some embodiments, the bypass valve may be opened when a certain pressure point is reached (e.g., measured using one or more pressure sensors) at the inlet of the crusher, which may indicate a partial plug or breakdown in the crusher. By opening the bypass valve for the pressurize fluid to flow through the bypass line, mud pump pressure build-up may be avoided when the crusher needs maintenance.

The fluid may then be directed through the bypass line to return to a downstream portion of the flow path downstream the outlet of the crusher, in step 712. The bypassed fluid may then be directed to the well system. For example, drilling fluid may be bypassed around the crusher while the crusher is shut-down to flow the drilling fluid directly from the mud pump(s) than the well system (e.g., to a standpipe manifold to be directed into a drill string).

When a fluid is being bypassed around a crusher (via the bypass line), the pumping rate of the mud pump(s) may be reduced. When pumping a fluid through the crusher resumes, the pumping rate of the mud pump(s) may be increased to account for pressure drops in the fluid flowing through the crusher.

Advantageously, by using hydraulically driven crushers according to embodiments of the present disclosure, a hydraulically driven crusher may be positioned along a flow path extending between mud pump(s) and the drill string in a well system, where the mud pump(s) may provide the hydraulic power for the crusher. In contrast, conventional crushers may be used in a return system of a well, where drilling fluid returning from downhole to the surface of the well may be collected and moved through the conventional crushers. Because conventional crushers may typically be driven using an external power source, the use of conventional crusher prior to sending the drilling fluid downhole (e.g., along a flow path extending between the mud pump(s) and the drill string) may pose challenges in the event of a power interruption.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A system, comprising:

at least one pump positioned at a surface of a well;

a drill string extending a depth into the well from the surface of the well;

piping fluidly connecting the at least one pump to the drill string; and a crusher positioned along the piping, wherein the crusher comprises:

a housing having an inlet and an outlet at opposite axial sides;

an impeller positioned proximate the inlet of the housing;

a shaft connected to the impeller and extending axially through the housing between the inlet and the outlet, such that the shaft is housed within the housing;

at least two spaced apart support structures holding the shaft in the housing, wherein the at least two support structures each extend a radial distance from the shaft to an inner wall of the housing; and a plurality of blades, comprising:

dynamic blades extending outwardly from the shaft; and fixed blades extending radially inward from the inner wall of the housing and alternatingly positioned between the dynamic blades.

2. The system of claim 1, wherein the at least two spaced apart support structures are plates, each plate comprising a plurality of holes extending through the plate.

3. The system of claim 1, further comprising a bypass line fluidly connected to the piping upstream of the inlet via a bypass valve and fluidly connected to the piping downstream of the outlet.

4. The system of claim 1, further comprising:

at least one mud tank fluidly connected to the mud pump; and a mud return system fluidly connected to the at least one mud tank.

5. The system of claim 1, wherein the crusher further comprises:

dynamic blade gaps formed between the inner wall of the housing and an outer perimeter of each of the dynamic blades;

fixed blade gaps formed between the shaft and an inner perimeter of each of the fixed blades;

a clearance formed between lateral sides of adjacent blades in the plurality of blades; and a total flow path area through the plurality of blades calculated as the sum of the dynamic blade gaps, the fixed blade gaps, and the clearance.

6. A method, comprising:

providing a crusher along a flow path extending from a mud pump to a standpipe in a well system, wherein the crusher comprises:

a housing;

a plurality of alternating fixed blades and dynamic blades positioned between an inlet and an outlet to the housing;

wherein the dynamic blades extend outwardly from a shaft extending through the crusher; and wherein the fixed blades extend inwardly from an inner wall of the housing; and an impeller connected to the shaft and positioned at an inlet side of the plurality of alternating fixed and dynamic blades, wherein the impeller comprises a plurality of pitched blades extending in a radially outward direction from the shaft; and pumping a drilling fluid from the mud pump through the crusher, wherein drilling fluid flow around the impeller rotates the impeller, the connected shaft, and the dynamic blades.

7. The method of claim 6, further comprising:

collecting the drilling fluid returned from downhole in the well system in at least one mud tank; and pumping the drilling fluid from the at least one mud tank to the crusher.

8. The method of claim 6, further comprising designing a flow area within the crusher such that a pressure drop in the drilling fluid flow between the inlet and the outlet is less than or equal to 500 psi, wherein the flow area is formed within the housing and between the dynamic blades and the fixed blades.

9. The method of claim 6, further comprising pumping the drilling fluid from the crusher to a standpipe in the well system.

10. The method of claim 6, further comprising:

opening a bypass valve on the piping to direct the drilling fluid from the piping to a bypass line; and directing the drilling fluid through the bypass line to return the drilling fluid to the piping downstream the outlet of the crusher.

11. The method of claim 10, wherein the bypass valve is opened when a pressure point is reached at the inlet of the crusher.

12. The method of claim 10, further comprising:

reducing a pumping rate of the mud pump while the drilling fluid is pumped through the bypass line.

* * * * *